UNITED STATES PATENT OFFICE 2,120,432

O-HYDROXYAZO DYESTUFFS

Paul Zervas, Cologne-Muhlheim, and Paul v. Lendenfeld, Leverkusen-Wiesdorf, Germany, assignors to General Aniline Works, Inc., New York, N. Y., a corporation of Delaware No Drawing. Application May 2, 1936, Serial No. 77,637. In Germany May 23, 1935

5 Claims. (Cl. 260—93)

The present invention relates to new water-soluble azodyestuffs, more particularly it relates to dyestuffs which may be represented by the following formula:

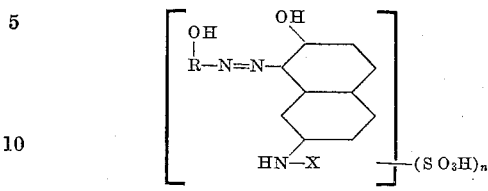

In the said formula R represents the radical of a diazotized aromatic amino bearing the hydroxy group in ortho-position to the azo group, for example the radical of a diazotized ortho-aminophenol compound, X stands for a hydrocarbon radical which may bear substituents, such as alkyl, hydroxyalkyl, alkoxyalkyl, cyclohexyl, aryl and aralkyl, or substituted aryl and aralkyl, such as tolyl, chlorophenyl, methoxyphenyl, chlorobenzyl and the like, and $n$ stands for a whole number, and wherein the naphthalene nucleus may be further substituted in any manner, as for example by halogen, the carboxylic acid group or the sulfonic acid group.

Our new dyestuffs are obtainable by combining in an alkaline medium, o-hydroxy-diazo compounds, as for example such of the benzene and naphthalene series, with derivatives of 2-amino-7-hydroxy-naphthalene, in which one hydrogen atom of the amino group is substituted by a hydrocarbon radical, as for instance, alkyl, hydroxyalkyl, cyclohexyl, aryl or aralkyl, and in which the naphthalene nucleus may be further substituted in any manner, as for example by halogen, the carboxyl group or the sulfonic acid group, selecting thereby the components in such a manner that at least one sulphonic acid group is present in the dyestuff molecule.

The dyestuffs obtained in this manner dye wool, when after-chromed, dark violet, blue to black shades of good fastness to fulling, steaming and light. Some of the dyestuffs can also be dyed according to the single-bath chroming process. Further the dyestuffs can be converted by treating with metal salts into complex metal compounds, the dyeings of which may be distinguished by an excellent dischargeability on wool and silk.

The following examples illustrate the invention:—

*Example 1.*—23.4 parts by weight of 4-nitro-2-amino-phenol-6-sulphonic acid are diazotized with 6.9 parts by weight of sodium nitrite and hydrochloric acid. At 3–5° C. the diazo solution is added to an aqueous solution alkaline with sodium carbonate of 23.5 parts by weight of 2-phenyl-amino-7-hydroxynaphthalene. The dyestuff separated is isolated. In its free state it corresponds to the following formula:

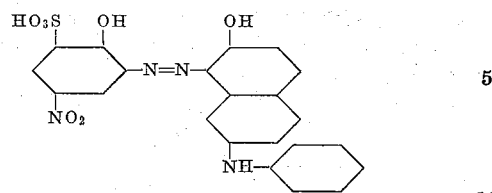

It dyes wool, when after-chromed, and in accordance with the single-bath chroming procedure, a full bloomy black shade of very good fastness properties.

*Example 2.*—22.4 parts by weight of 4-chloro-2-aminophenol-6-sulfonic acid are diazotized with 6.9 parts by weight of sodium nitrite and hydrochloric acid and coupled, in an alkaline solution, according to Example 1, with 23.5 parts by weight of 2-phenylamino-7-hydroxy-naphthalene. The dyestuff isolated, having in its free state the following formula:

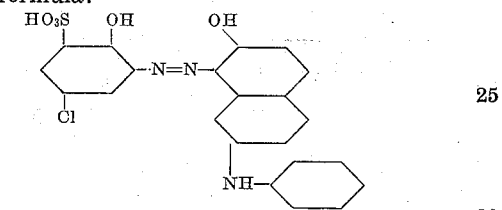

dyes wool, in accordance with the single-bath chroming process, navy blue shades.

When the dyestuff is converted, according to known methods, into the complex chromium compound, on wool and silk navy blue dyeings of excellent dischargeability are obtained.

*Example 3.*—15.4 parts by weight of 5-nitro-2-aminophenol are diazotized, with 6.9 parts by weight of sodium nitrite and hydrochloric acid. The diazo solution is added to an aqueous solution alkaline with sodium carbonate of 31.5 parts by weight of 2-phenylamino-7-hydroxynaphthalene-6-sulfonic acid. The dyestuff having in its free state the following formula:

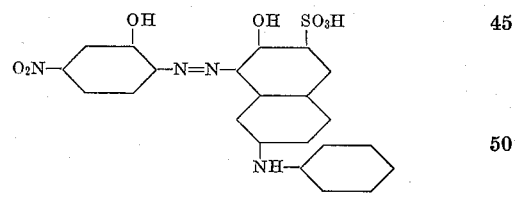

is isolated and dyes wool, when after-chromed, blue shades.

*Example 4.*—19.9 parts by weight of 4,6-dinitro-2-aminophenol are diazotized, in a medium alkaline with sodium carbonate, with 6.9 parts by weight of sodium nitrite and hydrochloric acid and, in a medium alkaline with sodium carbonate, combined with 31.5 parts by weight of 2-phenylamino - 7 - hydroxynaphthalene-6-sulfonic acid. The dyestuff having in its free state the following formula:

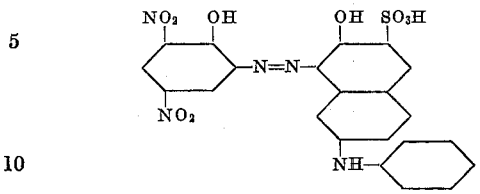

dyes wool, when after-chromed, black.

*Example 5.*—15.4 parts by weight of 5-nitro-2-aminophenol are diazotized and coupled, in a medium alkaline with sodium carbonate, with 28.3 parts by weight of 2-hydroxyethylamino-7-hydroxynaphthalene-6-sulfonic acid. The dyestuff having in its free state the following formula:

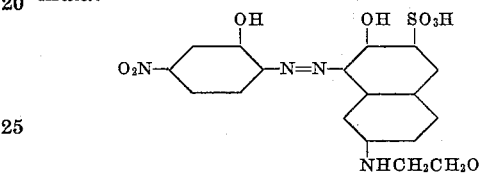

dyes wool, when after-chromed, navy blue. The complex chromium compound, manufactured in accordance with known methods, dyes wool blue shades.

In the annexed table there are given further combinations prepared in accordance with the invention and their shades on wool when after-chromed or dyed according to the single-bath chroming process.

We claim:

1. Watersoluble azodyestuffs selected from the group consisting of compounds having in the free state the following formula:

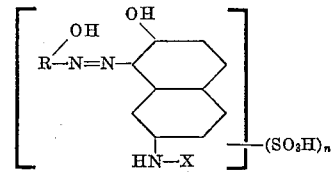

wherein R stands for the radical of a diazotized aromatic amine bearing the hydroxy group in ortho position to the azo group, X stands for a member selected from the group consisting of hydrocarbon radicals and hydroxy-, halogen- and alkoxy-substituted hydrocarbon radicals, $n$ stands for a whole number, and such derivatives thereof in which the naphthalene nucleus is substituted by substituents selected from the group consisting of halogen, the sulfonic acid and the carboxylic acid group, dyeing wool, when after-chromed dark violet to blue to black shades of good fastness to fulling, steaming and light.

2. Watersoluble azodyestuffs selected from the group consisting of compounds having in the free state the following formula:

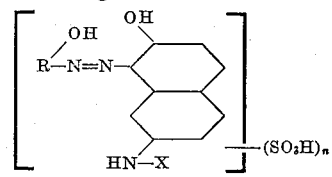

wherein R stands for a radical of the benzene series bearing the hydroxy group in ortho-posi-

| Diazotizing components | Coupling components | Shades on wool when chromed |
|---|---|---|
| 2-aminophenol-4,6-disulfonic acid | 2-phenylamino-7-hydroxynaphthalene | Violet gray. |
| 4-chloro-2-aminophenol-5-sulfonic acid | 2-phenylamino-7-hydroxynaphthalene | Blue. |
| 6-nitro-2-aminophenol-4-sulfonic acid | 2-phenylamino-7-hydroxynaphthalene | Do. |
| 6-chloro-2-aminophenol-4-sulfonic acid | 2-phenylamino-7-hydroxynaphthalene | Reddish blue. |
| 1-amino-2-naphthol-4-sulfonic acid | 2-phenylamino-7-hydroxynaphthalene | Gray. |
| 6-nitro-1-amino-2-naphthol-4-sulfonic acid | 2-phenylamino-7-hydroxynaphthalene | Do. |
| 5-nitro-2-aminophenol-4-sulfonic acid | 2-phenylamino-7-hydroxynaphthalene | Navy blue. |
| 4-nitro-2-aminophenol-6-sulfonic-acid | 2-hexahydroxyphenylamino-7-hydroxynaphthalene. | Black. |
| 4-chloro-2-aminophenol-6-sulfonic acid | 2-hexahydroxyphenylamino-7-hydroxynaphthalene. | Navy blue. |
| 4-nitro-2-aminophenol-6-sulfonic acid | 2-o-chlorophenylamino-7-hydroxynaphthalene | Black. |
| 4-nitro-2-aminophenol-6-sulfonic acid | 2-o-methylphenylamino-7-hydroxynaphthalene | Do. |
| 6-nitro-2-aminophenol-4-sulfonic acid | 2-o-methylphenylamino-7-hydroxynaphthalene | Reddish navy blue. |
| 4-chloro-2-aminophenol-6-sulfonic acid | 2-o-methylphenylamino-7-hydroxynaphthalene | Reddish blue. |
| 6-chloro-2-aminophenol-4-sulfonic acid | 2-o-methylphenylamino-7-hydroxynaphthalene | Reddish navy blue. |
| 4-nitro-2-aminophenol-6-sulfonic acid | 2-m-methylphenylamino-7-hydroxynaphthalene | Black. |
| 6-nitro-2-aminophenol-4-sulfonic acid | 2-m-methylphenylamino-7-hydroxynaphthalene | Navy blue. |
| 4-chloro-2-aminophenol-6-sulfonic acid | 2-m-methylphenylamino-7-hydroxynaphthalene | Do. |
| 6-chloro-2-aminophenol-4-sulfonic acid | 2-m-methylphenylamino-7-hydroxynaphthalene | Reddish navy blue. |
| 4-chloro-2-aminophenol-6-sulfonic acid | 2-p-methylphenylamino-7-hydroxynaphthalene | Reddish blue. |
| 4-nitro-2-aminophenol-6-sulfonic acid | 2-p-methylphenylamino-7-hydroxynaphthalene | Black. |
| 2-aminophenol-4,6-disulfonic acid | 2-p-methylphenylamino-7-hydroxynaphthalene | Reddish violet brown. |
| 6-chloro-2-aminophenol-4-sulfonic acid | 2-p-methylphenylamino-7-hydroxynaphthalene | Reddish navy blue. |
| 1-amino-2-naphthol-4-sulfonic acid | 2-p-methylphenylamino-7-hydroxynaphthalene | Greenish gray. |
| 4-nitro-2-aminophenol-6-sulfonic acid | 2-p-methoxyphenylamino-7-hydroxynaphthalene | Black. |
| 6-nitro-2-aminophenol-4-sulfonic acid | 2-p-methoxyphenylamino-7-hydroxynaphthalene | Navy blue. |
| 6-chloro-2-aminophenol-4-sulfonic acid | 2-p-methoxyphenylamino-7-hydroxynaphthalene | Reddish navy blue. |
| 4-chloro-2-aminophenol-6-sulfonic acid | 2-p-methoxyphenylamino-7-hydroxynaphthalene | Navy blue. |
| 4-nitro-2-aminophenol-6-sulfonic acid | 2-p-sulfophenylamino-7-hydroxynaphthalene | Dark gray. |
| 4-chloro-2-aminophenol-6-sulfonic acid | 2-p-sulfo-phenylamino-7-hydroxynaphthalene | Reddish navy blue. |
| 4-nitro-2-aminophenol-6-sulfonic acid | 2-p-carboxyphenylamino-7-hydroxynaphthalene | Black. |
| 6-nitro-2-aminophenol-4-sulfonic acid | 2-p-carboxyphenylamino-7-hydroxynaphthalene | Reddish blue. |
| 4-chloro-2-aminophenol-6-sulfonic acid | 2-p-carboxyphenylamino-7-hydroxynaphthalene | Navy blue. |
| 6-chloro-2-aminophenol-4-sulfonic acid | 2-p-carboxyphenylamino-7-hydroxynaphthalene | Bluish violet. |
| 4-nitro-2-aminophenol-6-sulfonic acid | 2-m-carboxyphenylamino-7-hydroxynaphthalene | Grayish black. |
| 4-chloro-2-aminophenol-6-sulfonic acid | 2-m-carboxyphenylamino-7-hydroxynaphthalene | Reddish navy blue. |
| 4-nitro-2-aminophenol-6-sulfonic acid | 2-butylamino-7-hydroxynaphthalene | Reddish black. |
| 5-nitro-2-aminophenol | 2 - ethylamino - 7 - hydroxy - napththalene - 6 - sulfonic acid. | Blue. |
| 5-nitro-2-aminophenol | 2 - butylamino - 7 - hydroxy - naphthalene - 6 - sulfonic acid. | Do. |
| 4-chloro-2-aminophenol | 2 - phenylamino - 7 - hydroxy - naphthalene - 6 - sulfonic acid. | Reddish blue. |
| 3, 4, 6,-trichloro-2-aminophenol | 2 - phenylamino - 7 - hydroxy - naphthalene - 6 - sulfonic acid. | Grayish violet. |
| 5-nitro-2-aminophenol | 2 - o - methoxyphenylamino - 7 - hydroxynaphthalene-6-sulfonic acid. | Bluish black. | tion to the azo group, X stands for a member selected from the group consisting of hydrocarbon radicals and hydroxy-, halogen- and alkoxy-substituted hydrocarbon radicals, $n$ stands for one of the numbers 1 and 2 and such derivatives thereof in which the naphthalene nucleus is substituted by substituents selected from the group consisting of halogen, the sulfonic acid and the carboxylic acid group, dyeing wool, when after-chromed dark violet to blue to black shades of good fastness to fulling, steaming and light.

3. Watersoluble azodyestuffs having in the free state the following formula:

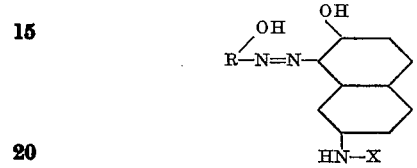

wherein R stands for the radical of a diazotized orthoaminophenol sulfonic acid compound and X stands for a member selected from the group consisting of hydrocarbon radicals and hydroxy-, halogen- and alkoxy-substituted hydrocarbon radicals.

4. The dyestuff having in its free state the following formula:

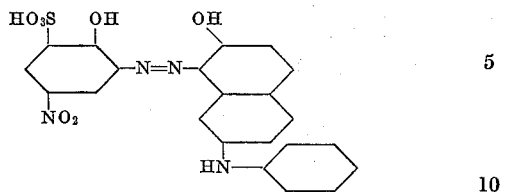

dyeing wool when after-chromed a full bloomy black shade of very good fastness properties.

5. The dyestuff having in its free state the following formula:

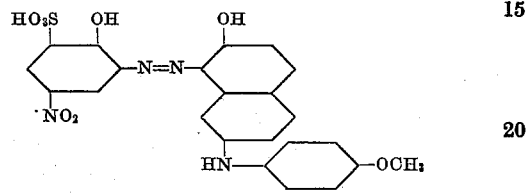

dyeing wool when after-chromed a full black shade of good fastness properties.

PAUL ZERVAS.
PAUL v. LENDENFELD.